(12) United States Patent
Simmons

(10) Patent No.: US 8,306,683 B2
(45) Date of Patent: Nov. 6, 2012

(54) GUIDE-BY-WIRE VEHICLE STEERING

(76) Inventor: Robert J. Simmons, Hayward, CA (US)

(*) Notice: Subject to any disclaimer, the term of this patent is extended or adjusted under 35 U.S.C. 154(b) by 901 days.

(21) Appl. No.: 12/228,759

(22) Filed: Aug. 15, 2008

(65) Prior Publication Data

US 2009/0062986 A1 Mar. 5, 2009

Related U.S. Application Data

(60) Provisional application No. 60/965,174, filed on Aug. 17, 2007.

(51) Int. Cl.
*G01C 22/00* (2006.01)
*G05D 1/00* (2006.01)

(52) U.S. Cl. ........ 701/23; 701/24; 701/41; 701/72; 701/408

(58) Field of Classification Search .......... 701/23, 701/41, 207, 24, 72, 408; 180/168, 167, 180/169; 336/138, 174; 318/16, 587
See application file for complete search history.

(56) References Cited

U.S. PATENT DOCUMENTS

| | | | | |
|---|---|---|---|---|
| 2,493,755 A * | 1/1950 | Ferrill, Jr. | | 180/168 |
| 4,249,630 A * | 2/1981 | Lougheed et al. | | 180/168 |
| 5,343,145 A * | 8/1994 | Wellman et al. | | 324/202 |
| 6,009,357 A * | 12/1999 | Wellman et al. | | 701/23 |
| 6,269,897 B1 * | 8/2001 | Tamura et al. | | 180/168 |
| 6,336,064 B1 * | 1/2002 | Honkura et al. | | 701/23 |
| 6,971,464 B2 * | 12/2005 | Marino et al. | | 180/167 |
| 7,635,053 B2 * | 12/2009 | Kozsar | | 191/10 |
| 2003/0106731 A1 * | 6/2003 | Marino et al. | | 180/168 |
| 2006/0090952 A1 * | 5/2006 | Ito | | 180/446 |
| 2007/0089956 A1 * | 4/2007 | Kozsar | | 191/10 |
| 2009/0128139 A1 * | 5/2009 | Drenth et al. | | 324/207.22 |
| 2009/0204286 A1 * | 8/2009 | Costes | | 701/29 |

* cited by examiner

*Primary Examiner* — Khoi Tran
*Assistant Examiner* — Jorge Peche
(74) *Attorney, Agent, or Firm* — Jon M. Dickinson, Esq.; Robert D. Vantz, Esq.

(57) ABSTRACT

Guide-by-wire vehicle steering involving (a) preparing a vehicle lane in a roadway with a passive, lane-following, elongate, lateral-triangulation responder, (b) equipping a selected vehicle having signal-controllable steering mechanism with a lateral-triangulation transceiver operatively associated, and interactive, with the responder, and signal-control-linked to the selected vehicle's signal-controllable steering mechanism, (c) with such a vehicle traveling along the roadway, interacting the transceiver and the responder, and (d) by such interacting, applying, as necessary, control signals from the transceiver to the vehicle's signal-controllable steering mechanism, thereby to control vehicle steering so as to assure vehicle following of the prepared vehicle lane. Also disclosed is system structure capable of performing these vehicle-steering steps, and selectively, additionally, communicating non-position roadway information in addition to steering-control information.

2 Claims, 2 Drawing Sheets

GUIDE-BY-WIRE VEHICLE STEERING

CROSS REFERENCE TO RELATED APPLICATIONS

This application claims priority to currently copending, prior-filed U.S. Provisional Patent Application Ser. No. 60/965,174, filed Aug. 17, 2007, for "Guide-by-Wire Vehicle Steering". The entire disclosure content of that provisional application is hereby incorporated herein by reference.

BACKGROUND AND SUMMARY OF THE INVENTION

As roads progressively crowd with vehicles, and landscape increasingly crowds with roads and associated visual and other distractions, automated safety systems associated with vehicles to protect drivers, passengers and others, have taken on a large role in attempting to forgive dangerous driver-fault and vehicle-fault errors. Proper and safe vehicle steering fits into this picture of safety concern, and the present invention takes aim at this issue.

In particular, this invention pertains to automated, but driver-overridable, "guide-by-wire" vehicle steering which is associated with specially prepared vehicle lanes in a roadway, or a roadway system, and to vehicles which have been uniquely adapted, or equipped, to make use of the invention. The invention is characterized by both systemic and methodologic aspects.

The concept of "guide-by-wire" behavior involving the present invention essentially refers to the fact that the invention contemplates the relatively simple installation, as a structure buried in a groove cut along, and accurately following, a vehicle lane in a roadway surface, of an elongate, passive, linear, "wire-like" infrastructure which is either (a) electrically conductive and electromagnetically responsive in a continuous sense along its length, or alternatively (b), intermittently conductive and electromagnetically responsive in the "visual sense" of a dashed line—an intermittent structure which might, for example, include an elongate element possessing spaced conductive elements and interposed spaces which are non-conductive. Such a "dashed-line" structure is also referred to herein as being a stepped-intermittent electrical conductor.

With respect to this proposed, elongate infrastructure which is to be buried-installed, i.e., ultimately covered over, in an elongate, small-dimension groove cut into a roadway surface, generally speaking along the centerline of a vehicle traffic lane, this infrastructure is, per se, and as was mentioned above, a passive structure in the sense that it is not energized to originate any kind of an electrical/electromagnetic signal. It is, however, capable of responding to an electromagnetic field by responsively, effectively re-radiating such a field. This infrastructure is also referred to herein as a responder.

Equipped in appropriately prepared (i.e., system-equipped) vehicles which are intended to make use of the features of this invention is an on-board, signal-controllable, automated, steering-control mechanism which can be overridden selectively by a driver, or, in a converse sense, intermittently activated by a driver. This automated steering-control mechanism is designed to respond to appropriately linked electrical control signals which effectively issue steering commands to a "prepared" vehicle's steering system so as to cause that vehicle to follow a steering-controlled path of travel as defined by the buried, linear infrastructure. Such vehicle preparation may involve either originally installed vehicle equipment, or later-installed, retrofit equipment.

Feeding steering information, by way of the mentioned, appropriate electrical control signals, to this automated steering-control mechanism, through a suitable interconnect structure, is a vehicle-on-board circuitry arrangement in the form of laterally-triangulating, electromagnetically-responsive triangulation structure. The term "triangulation structure" is intended to refer to any position-locating structure which is capable of determining the lateral position of a vehicle in a vehicle travel lane. One form of such structure is specifically disclosed herein.

This triangulation structure is an active, "vehicle-on-board" electronic structure that transmits, downwardly toward an invention-prepared roadway underlying an equipped and prepared vehicle, relatively conventional, electromagnetic-field signals, such as conventional metal-detection signals. It does this via a pair of laterally spaced transmission/reception devices borne on the vehicle. Any appropriate, conventional, metal-detection form of such signals may be employed. These transmission/reception devices preferably each takes the form of conventional, metal-detection transceiver devices. This on-board circuitry arrangement looks for reflection-return (re-radiated) signals (from the buried infrastructure), from which return signals a triangulation is performed to produce an output steering-control signal that is indicative of a vehicle's lateral position relative to the buried infrastructure.

The idea, of course, is that, with the system of this invention implemented, and its methodology in use, steering of a vehicle so that the vehicle remains properly laterally positioned, at least within certain lateral drift tolerances, relative to a vehicle travel lane, may be controlled completely by the interaction which takes place between the buried elongate conductive infrastructure, and the laterally triangulating circuitry arrangement which sends the mentioned control output signals to direct vehicle steering.

Multiple-lane installations of buried infrastructure may, of course, be employed, and as will be mentioned below herein, it is entirely possible to implement a system wherein control signals associated with different vehicle lanes, and with different vehicle-flow directions, are distinguishable.

These and various other features and advantages of, and offered by, the present invention, such as the communication to a vehicle of selected non-position roadway information, will become more fully apparent as the detailed description which follows below is read in conjunction with the several drawings.

DETAILED DESCRIPTION OF THE INVENTION

Figure 1:
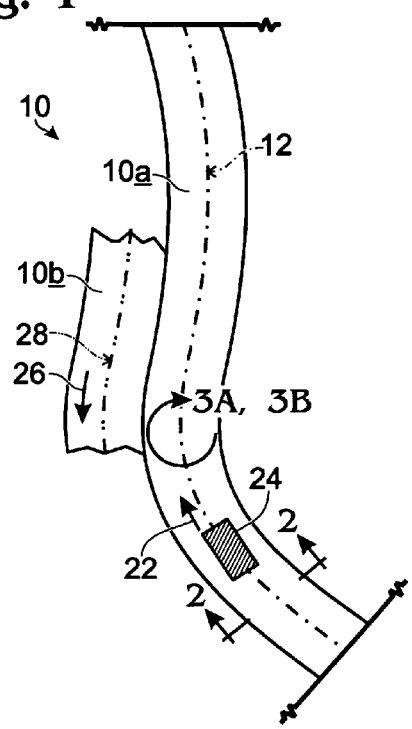
FIG. 1 is a simplified and fragmentary plan view of a serpentine-curving portion of a roadway having a pair of opposite-direction vehicle lanes which have been prepared for use in conjunction with the structure and methodology of the present invention.
Figure 2:
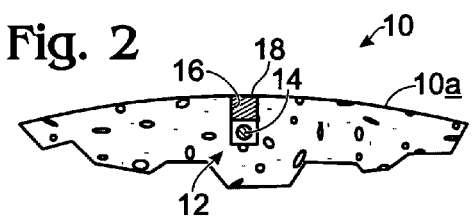
FIG. 2 is a fragmentary, enlarged, cross-sectional view taken generally along the line 2-2 in FIG. 1.

Turning now to the drawings, and referring first of all to FIGS. 1-3B, inclusive, indicated generally at 10 in FIG. 1 is a serpentine-curving portion of a roadway having a pair of vehicle lanes 10a, 10b which have been prepared each with elongate, passive, electrically-conductive and electromagnetically-responsive wire infrastructure in accordance with the preferred and best-mode form of the present invention. Inasmuch as such lane preparation is substantially the same for both of these lanes, description of the invention will initially proceed herein with reference made specifically to lane 10a.

Accordingly, lane 10a has been prepared with wire infrastructure 12, which infrastructure is also referred to herein as a wire-like structure, and as a passive, lane-following, elongate, lateral-triangulation responder. This wire infrastructure, in the preferred and best-mode embodiment of the invention which is now being described, takes the form of an elongate, linear, continuous electrical conductor, or wire, 14 which has been placed, generally centrally within lane 10a, in an elongate, continuous groove 16 which has been appropriately cut into the vehicle lane to a suitable depth, such as about 1- or 2-inches. An appropriate capping-structure material 18 is placed in groove 16 overhead conductor 14 to bury the conductor securely within groove 16.

Figure 3A:
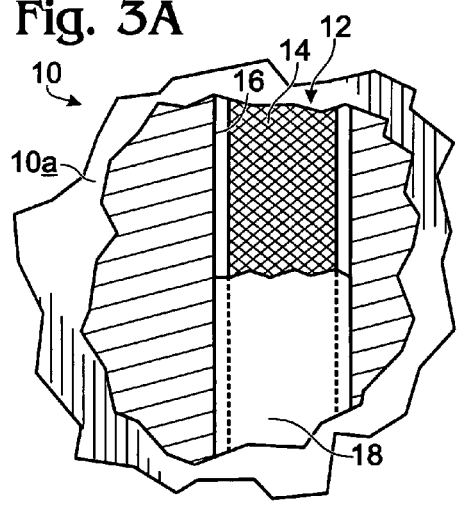
FIG. 3A is an even larger-scale fragmentary view, with portions broken away to reveal details of construction, taken generally from the area encircled by the nearly circular, double-headed arrow 3A, 3B in FIG. 1. This view illustrates a fragmentary portion of a preferred and best-mode embodiment of the invention.

FIG. 3A in the drawings, which illustrates a fragmentary portion of the vehicle-lane structure of the invention that has just been described, specifically shows a fragment of vehicle lane 10a, with a portion of this lane being broken away in order to reveal organizational details of conductor 14, groove 16 and capping material 18.

Wire 14, in the system of the present invention, is a completely passive element, but is capable of responding to received electromagnetic radiation by re-radiating a related electromagnetic field. This re-radiation phenomenon is one which is extremely well-known to those generally skilled in the relevant art.

Figure 3B:
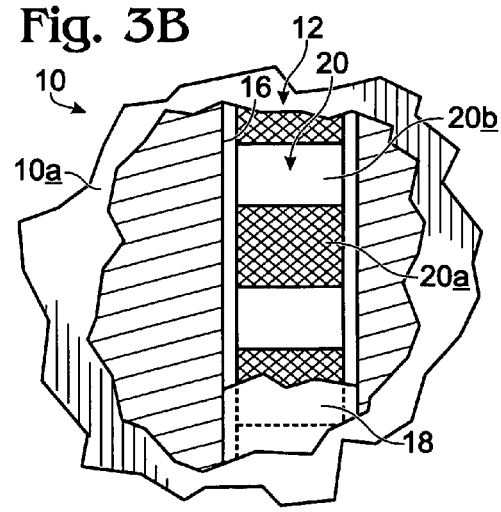
FIG. 3B is similar to FIG. 3A, except that it shows a modified form of the invention.

FIG. 3B, which is similar to FIG. 3A, illustrates a modified form of embedded wire-like structure 20 which differs from continuous wire 14 by being a conductively discontinuous element formed with alternating, conductive and non-conductive segments 20a, 20b, respectively. Structure 20 is also referred to herein as an elongate, stepped-intermittent electrical conductor which, in relation to its alternating conductive and non-conductive segments, has the visual appearance somewhat of a dashed line, characterized by the presence of short, conductive line segments alternating with short, non-conductive regions/segments. While these conductive and non-conductive segments are illustrated herein as being of equal length (i.e., of equal intermittency) along structure 20, they may, if desired, be characterized by a selected pattern of unequal-length (i.e., of unequal intermittency) segments.

A segment pattern may also, if desired, be constructed to communicate, by the nature of the pattern, various non-position information, such as, for example, "approaching" roadway configuration (i.e., sharp curves, etc.) information. As will be mentioned again shortly, reception of such non-position information may be accommodated by any suitable form of receiving structure mounted in a system-equipped vehicle.

Vehicle lane 10b, which is laterally adjacent lane 10a, represents a lane in roadway 10 designed for opposite-direction traffic relative to the traffic direction which is shown by arrow 22 in lane 10a for a vehicle 24 therein. This opposite-direction arrow for lane 10b appears at 26.

One feature of the invention which may be very useful in a typical plural-lane roadway is that each vehicle lane will be equipped with wire infrastructure which is specific to that lane. For example, the wire infrastructure for lane 10b is shown generally by a dash-double-dot line 28 in FIG. 1.

As will become apparent, differentiated wire infrastructures may be employed to differentiate vehicle-steering control signals for different vehicle lanes. As an illustration, while infrastructure 28 is, in substantially all basic structural and functional respects, the same as previously described infrastructure 12, it may, if desired, be constructed so as to be, in a small sense, structurally differentiated from infrastructure 12 in respect of the nature of the elongate conductor structure, such as structure 14, which is included in a covered groove prepared generally centrally in lane 10b. More specifically, one might choose to deal with such a plural-lane situation by equipping lane 10a with a wire structure like that shown in FIG. 3A, and lane 10b with a wire structure like that shown in FIG. 3B.

When the system of the invention is in use, re-radiated signals which are to be used, as will be explained, principally (although not always solely) to provide vehicle steering control, may thus be differentiated from one lane to another, whereby steering-control instruction, and possibly, selectively, other information, implemented by the system of the invention do not become involved with what might be thought of as an improper cross-lane cross-talk. From the description of the present invention which now continues, those skilled in the art will come to recognize that there may be various, not specifically illustrated, wire infrastructures employed in the practice of the invention which may be used to provide quite specific vehicle lane differentiation regarding laterally adjacent lanes in a plural-vehicle-lane roadway.

Further with regard to the concept illustrated in FIG. 1 regarding the capability of the present invention to handle a plural-vehicle-lane situation, and while vehicle lane 10b was simply described above in conjunction with its being a vehicle lane disposed laterally adjacent lane 10a intended for traffic in the opposite direction, it should be apparent that the invention may be used with any plural-lane roadway, such as a freeway, where there might be more than a single lane headed in a single direction. In this kind of a situation, it will be the case that each such common-direction lane may be equipped with a groove-embedded responder wire structure, and that such wire structure may be differentiated for such lanes. Vehicle on-board circuit structure designed to cooperate with such buried wire infrastructure will readily be constructible conventionally to handle such differentiation.

Figure 4:
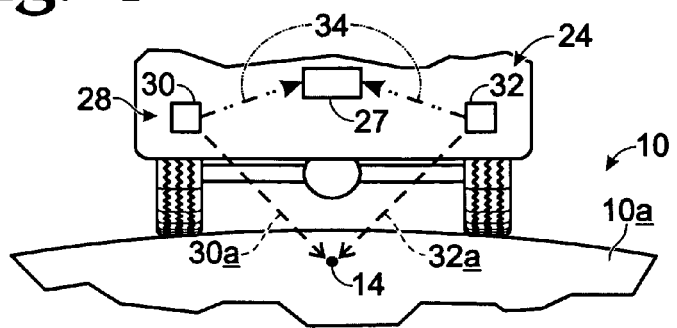
FIG. 4 is a fragmentary elevation, partly in cross section, similar in point of view to that which is presented in FIG. 2, illustrating, over essentially the same fragment of roadway which is pictured in FIG. 2, the under-portions of a vehicle (also seen in FIG. 1) which has been prepared and equipped with guide-by-wire systemic structure made in accordance with a preferred and best-mode embodiment of the present invention.
Figure 5:
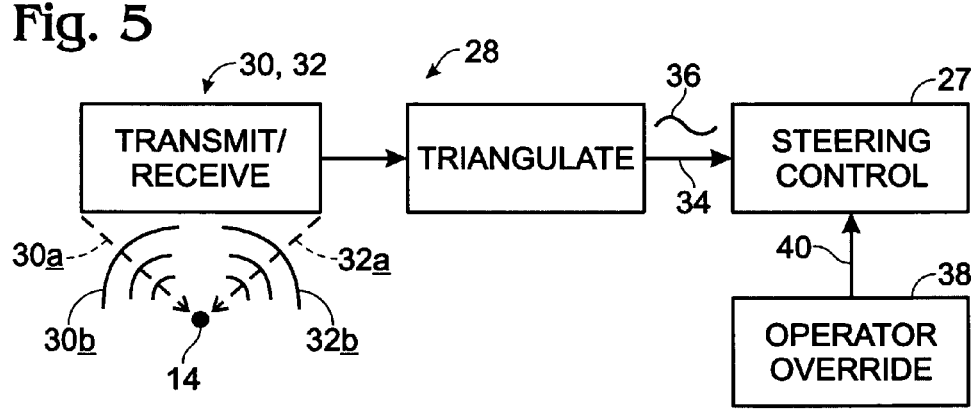
FIG. 5 is a simplified, block/schematic illustration which is useful in describing and picturing the overall system and methodology of the invention.

Considering now FIGS. 4 and 5 along with the other drawing figures, and referring to vehicle 24 which has been pictured and discussed initially and very briefly with respect to FIG. 1, a fragmentary undercarriage portion of vehicle 24 is shown in long-axis view in FIG. 4. This view, as can be seen, is a very simplified, fragmentary view of vehicle 24. In accordance with the invention, vehicle 24 is equipped with an appropriate signal-controllable steering mechanism 27 which may be entirely of conventional design, and thus the details of which are not described or illustrated herein. This onboard, signal-controllable steering mechanism is responsive, as will shortly be explained, to what is referred to herein variously as a signal-steering-management control signal, as a steering-control signal, and as a vehicle-lane-associated, vehicle-steering-management control signal, to apply steering control to the onboard, signal-controllable steering mechanism, so as, ultimately, to cause vehicle 24, when it is under the control of the system of the present invention, essentially to follow the pathway along vehicle lane 10a defined by the embedment path (groove 16) created for wire infrastructure 14.

In the particular embodiment of the invention now being described, included as on-board, steering-control, lateral, electromagnetically-responsive triangulation structure 28, also referred to herein as lateral-triangulation structure, are two, laterally spaced, lateral-triangulation transceivers 30, 32, appropriately disposed near the underside of vehicle 24 adjacent laterally opposite sides of that vehicle. Transceivers 30, 32 are operable by system 28 to transmit electromagnetic field signals, such as any one of a variety of conventional metal-detection signals, as indicated by arrowheaded-dashed lines 30a, 32a, in FIGS. 4 and 5, ultimately downwardly toward lane 10a and wire infrastructure 14.

Transceivers 30, 32 are connected in system 28 to a block marked "TRIANGULATE" in FIG. 5, which in turn is operatively connected through appropriate interconnect structure 34, represented by an arrow in FIG. 5, to previously mentioned steering-control mechanism 27 which is shown in block form both in FIG. 4 and in FIG. 5. In FIG. 5, the mentioned steering-control signal which is supplied to mechanism 27 is shown generally at 36.

The block in FIG. 5 which represents transceivers 30, 32, may also house reception circuitry (receiving structure which is internally conventional in nature) designed to receive from the relevant wire infrastructure user selected non-position roadway information, such as that mentioned earlier herein.

In accordance with the present invention, its system is operable in what are referred to herein as active and non-active conditions which are vehicle-operator selectable. Accordingly, in FIG. 5, there is a block 38, labeled 'OPERATOR OVERRIDE', which is linked by a connection represented by an arrow 40 effectively to the control interface (not specifically illustrated) which exists between steering-control mechanism 27 and system 28. This connection enables a vehicle operator to override automatic steering control, or to select such control, as desired.

When system 28 is placed into operation to furnish steering-control signals, transceivers 30, 32 are operated to radiate toward wire infrastructure 12 electromagnetic field signals, such as those previously mentioned represented by dashed arrows 30a, 32a in FIG. 5. The wire infrastructure, in whatever form it exists as installed in a roadway vehicle lane, re-radiates such transmissions in a conventionally understood fashion, and does so generally as indicated at 30b, 32b, in FIG. 5.

With this operation under way, system 28 functions to perform triangulation so as effectively to track the location of the wire infrastructure relative to the lateral position of a vehicle, such as vehicle 24. From such triangulation, system 28 generates a steering-control signal 36 which is supplied to the mentioned steering-control mechanism to effect appropriate automatic steering control of the associated vehicle so as to cause that vehicle to follow the pathway defined by the embedded wire infrastructure.

System 28 may be appropriately configured, in manners well understood by those skilled in the art, to differentiate different kinds of re-radiation signals, if such exist in an installation where, for example, different laterally adjacent vehicle lanes may be equipped with differently configured wire infrastructure patterns. Such differentiation may be employed suitably to keep a particular vehicle on track with respect to a particular vehicle lane, and to keep appropriately separated reverse-direction vehicle traffic in situations where opposite-direction vehicle lanes may be adjacent one another without any kind of intervening barrier.

Accordingly, a unique guide-by-wire vehicle steering system and methodology have been illustrated and described herein—a system and methodology aimed at addressing steering-control safety issues as illustrated earlier in this text. The system may also be structured to communicate user-selected, non-position, roadway-relevant information.

From a methodologic point of view, the invention may be described as furnishing guide-by-wire vehicle steering including the steps of (a) preparing a vehicle lane in a roadway with a passive, lane-following, elongate, lateral-triangulation responder, (b) equipping a selected vehicle having signal-controllable steering mechanism with a lateral-triangulation transceiver operatively associated, and interactive, with such a responder, and signal-control-linked to the selected vehicle's signal-controllable steering mechanism, (c) with such a vehicle traveling along the prepared roadway, interacting the transceiver and the responder, and (d) by such interacting, applying, as necessary, control signals from the transceiver to the vehicle's signal-controllable steering mechanism, thereby to control vehicle steering so as to assure vehicle-following of the prepared vehicle lane.

The methodology just-above described is one wherein the preparing step involves embedding electrically conductive, wire-like structure in the mentioned vehicle lane. Further, this methodology is one wherein embedding may be performed by establishing an elongate groove in a vehicle lane, and by placing an elongate, continuous, electrical conductor in that groove. Such embedding may also be performed by establishing an elongate groove in a selected vehicle lane, and placing an elongate, stepped-intermittent electrical conductor in that groove. Such stepped intermittency may be unequal, as mentioned earlier herein.

Accordingly, while a preferred and best-mode system and methodology have been described and illustrated herein, and certain modifications suggested, it is appreciated that other modifications and variations may be made without departing from the spirit of the invention.

I claim:

1. A passive, guide-by-wire, vehicle steering control system implemented in adapted vehicles having signal-controllable steering systems, and in a roadway having a vehicle lane comprising:

an elongate, passive, electrically- conductive and electromagnetically-responsive wire infrastructure embedded in a roadway substantially following the course of the vehicle lane in the roadway; and for each vehicle adapted for use in said system having a signal-controllable steering mechanism, and with respect to each vehicle's steering mechanism, (a) vehicle-installed, on-board, steering-control, lateral, electromagnetically-responsive triangulation structure configured to generate an electromagnetic field signal downwardly toward said wire infrastructure embedded in a road wherein the vehicle is driven, wherein said elongate, passive, electrically-conductive and electromagnetically-responsive wire infrastructure is configured to receive said electromagnetic field signal and re-radiate said received electromagnetic field signal, and said vehicle-installed, on-board, steering-control, lateral, electromagnetically-responsive triangulation structure is configured to track the lateral location of the vehicle in a vehicle travel lane by triangulating said re-radiated electromagnetic field signal, and to produce, based upon such tracking, a vehicle- lane-associated, vehicle-steering-management control signal which indicates the lateral, vehicle-lane position of the associated vehicle relative to the triangulation-tracked wire infrastructure associated with that lane, and (b) interconnect structure operatively interconnecting the system-adapted vehicle's signal-controllable steering mechanism and that vehicle's associated and installed lateral triangulation structure, whereby travel of the vehicle along the vehicle lane is accompanied by appropriate automatic steering of the vehicle under the control of the vehicle-lane-associated steering-management control signal.

2. The steering control system of claim 1 which is structured to be switchable between active and non-active conditions under the selective control of the operator of a system-adapted vehicle.

* * * * *